US009689330B2

(12) United States Patent
Dorn et al.

(10) Patent No.: US 9,689,330 B2
(45) Date of Patent: Jun. 27, 2017

(54) DPF REGENERATION IN A POWER SYSTEM THAT INCLUDES PARALLEL GENERATORS

(71) Applicant: Kohler Co., Kohler, WI (US)

(72) Inventors: Douglas W. Dorn, Sheboygan Falls, WI (US); Isaac S. Frampton, Strattanville, PA (US)

(73) Assignee: Kohler Co., Kohler, WI (US)

( * ) Notice: Subject to any disclaimer, the term of this patent is extended or adjusted under 35 U.S.C. 154(b) by 91 days.

(21) Appl. No.: 14/607,845

(22) Filed: Jan. 28, 2015

(65) Prior Publication Data

US 2016/0215666 A1    Jul. 28, 2016

(51) Int. Cl.
| | |
|---|---|
| F01N 3/023 | (2006.01) |
| F02B 63/04 | (2006.01) |
| F02D 41/02 | (2006.01) |
| F02D 29/06 | (2006.01) |
| F01N 9/00 | (2006.01) |
| F02D 25/00 | (2006.01) |

(52) U.S. Cl.
CPC .......... *F02D 41/021* (2013.01); *F01N 9/002* (2013.01); *F02D 25/00* (2013.01); *F02D 29/06* (2013.01); *F02B 63/04* (2013.01); *F02D 41/029* (2013.01); *F02D 2200/0812* (2013.01)

(58) Field of Classification Search
CPC .......... F01N 3/023; F01N 9/002; F02D 29/06; F02D 25/00; F02D 41/021; F02D 2200/0812; F02D 41/029; F02B 63/04
See application file for complete search history.

(56) References Cited

U.S. PATENT DOCUMENTS

| | | | |
|---|---|---|---|
| 2006/0096280 A1* | 5/2006 | Zhan | F01N 9/002 60/297 |
| 2010/0186373 A1* | 7/2010 | Pierz | F01N 3/027 60/274 |
| 2012/0049638 A1* | 3/2012 | Dorn | H02J 3/42 307/87 |
| 2014/0150407 A1* | 6/2014 | Van Niekerk | F01N 3/2066 60/274 |

* cited by examiner

*Primary Examiner* — Mark Laurenzi
*Assistant Examiner* — Brandon Lee
(74) *Attorney, Agent, or Firm* — Schwegman Lundberg & Woessner, P.A.

(57) ABSTRACT

A power system may include a first generator configured to be connected to at least one other generator. Each generator may be configured to be connected to a bus. The bus may be connected to at least one load. The first generator includes a controller that operates the first generator and determines a need to regenerate a diesel particulate filter in the first generator. The controller communicates the need to regenerate the diesel particulate filter to the at least one other generator.

20 Claims, 10 Drawing Sheets

DPF REGENERATION IN A POWER SYSTEM THAT INCLUDES PARALLEL GENERATORS

TECHNICAL FIELD

This disclosure generally relates to DPF regeneration, and more specifically relates to DPF regeneration in a power system that includes parallel generators.

BACKGROUND

Standby generators are often used to provide electrical power when power is unavailable from an electric utility company (e.g. during weather disturbances). In addition, prime power or continuous duty generators are often used to provide electrical power at a remote location where utility company power is not available.

One type of electric generator comprises an internal combustion engine driving an electrical alternator that produces alternating electricity. Often times the internal combustion engine is a diesel engine.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
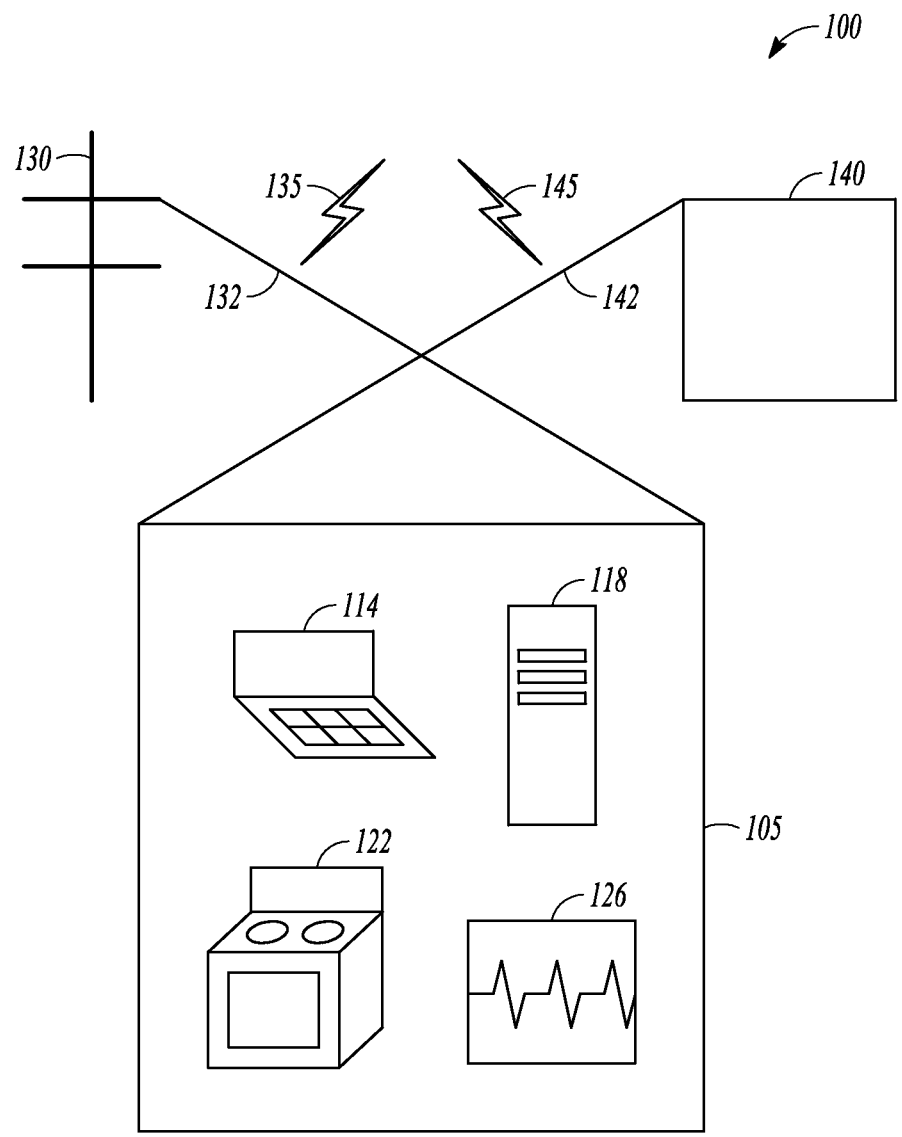
FIG. 1 is an example of a power delivery environment.

When a situation may require large amounts of power, there can be advantages to employing multiple small generators rather than a single large generator. One of the advantages is redundancy. If one generator fails or requires maintenance, a multi-generator system is still able to supply some power, while a single generator system would not.

In addition, if a situation requires greater capacity than can be provided by an existing single generator system, then the single generator system can be readily turned into a multi-generator system by adding another generator. Adding a generator may be more desirable than bearing the cost of replacing a single generator with an even larger generator.

Particulate matters that are discharged with the exhaust from the diesel engine of a generator have a perceived negative effect on the environment. Diesel engines typically include a diesel particulate filter (hereafter "DPF"), oxidation catalysts and nitrous oxide (NOx) catalysts.

The DPF is used to capture particulates, which consist largely of carbon particles. These carbon particles tend to plug the DPF, resulting in a restriction to the flow of exhaust gas. The DPF is routinely regenerated by purging the DPF of these particulates. Purging may include physically removing them with a brush or blast of air or may include burning them by elevated temperature.

Active regeneration of a DPF is commonly achieved by artificially increasing the exhaust gas temperature above a predetermined level in order to incinerate the carbon particles accumulated in the DPF. One conventional method used to increase the exhaust gas temperature involves controlling a throttle valve in the intake manifold of the engine. Another method used to increase temperature may include injecting flammable material into the exhaust stream.

Passive regeneration may occur during normal operation of the generator. Regeneration during normal operation may occur while electrical loads are high, and exhaust temperature is high enough to incinerate the carbon particles accumulated in the DPF.

In some cases, high exhaust temperatures may not be achieved during normal operation of the generator and carbon particles may accumulate in the DPF to an unacceptable level. If too many carbon particles accumulate in the DPF, the generator may be removed from service or operate under special conditions. As an example, the generator may be required to operate at a low speed that may be insufficient to produce acceptable electrical frequency. Another technique that can prevent this is called active regeneration, which elevates the exhaust temperature while continuing to operate normally otherwise.

The high exhaust temperatures that are generated during any type of regeneration may be problematic in some instances. As an example, a generator may be operating near flammable materials. In this case, it may be desirable to prevent active regeneration which may excessively elevate the exhaust temperature.

Known techniques for raising the exhaust gas temperature often result in an increase in the fuel consumption during the regeneration process. This increase in fuel consumption may be problematic if the active regeneration occurs while an engine's fuel tank is near empty. As an example, there may be a rapid reduction in a generator's remaining operating time during a critical circumstance. In an extreme case, the higher fuel consumption may result in the generator running out of fuel before refueling can occur.

There may be circumstances where it is desirable to prevent active regeneration. As an example, the generator may be operating in an emergency situation where the time that the generator is available for producing electric power should be maximized.

If regeneration has been prohibited during normal operation of a diesel engine, carbon particles may accumulate in the DPF. In such a case, a special regeneration sequence may be manually initiated while the engine is warm, prior to shutting down. One such sequence is referred to as parked regeneration and the available power output of the generator may be de-rated during parked regeneration.

There may be circumstances where it may be advantageous to monitor accumulated particulates in the DPF. If the accumulated particulates in the DPF are high enough, then it may be desirable to automatically initiate a regeneration when the generator is no longer required, prior to shut down.

In some generators, the engine controller may monitor and control the emissions related equipment and the generator controller may provide high level system control.

None of the existing systems that include generators operating in parallel take into consideration the effect that regenerating one of the DPFs in the system will have on the rest of the generators in the system. The paralleled generators are typically operated independently of one another with regard to regenerating the DPFs that are included in each generator. As an example, a load may not be able to be met by the rest of the generators when one of the paralleled generators is taken offline for regeneration. As another example, a simultaneous parked regeneration of multiple DPFs in the system could cause an inability to supply the load.

There is a need for a system that manages DPF regeneration in parallel generators where the system is capable of preventing excessive accumulation of particulate matters in each DPF beyond a permissible quantity, and supplying at least some minimum amount of electrical power. Preventing excessive accumulation of particulate matters in each DPF may prevent degradation of diesel engine output and potential damage of each DPF. One potential source of damage to each DPF may occur when an overly large amount of the particulate matter is rapidly combusted to expose the DPF to excessive (and damaging) heat.

FIG. 1 is an example of a power delivery environment 100 that includes a receiving station 105. The receiving station 105 may be any device, unit, building, grid, or combination that may receive power. The receiving station 105 may use some or all of the received power, may distribute some or all of the received power to other power-consuming devices, or both. For example, the receiving station 105 may be a building, or a circuit breaker within the building, which may be configured to receive and distribute power to one or more power-consuming devices within or around the building. Examples of power-consuming devices which the receiving station 105 may distribute received power to may include a computer 114, a server 118, a household appliance 122, a medical instrument 126, personal entertainment devices, appliances, industrial or manufacturing machinery, lighting units, or virtually any other electronic devices configured to receive and use power.

The receiving station 105 may communicate with and receive power from one or more sources. For example, the receiving station 105 may receive primary power 135 from a primary power source 130. The primary power source 130 may be a utility or power company, a generator or set of generators, another source of primary power, or any combination. The primary power 135 may be voltage, alternating current, direct current, voltage, or various other forms of power. The primary power source 130 may provide primary power 135 to the receiving station 105 through a primary power connection 132, such as a power line, wiring, or other power delivery component.

Additionally or alternatively, the receiving station 105 may receive secondary power 145 from a secondary power source 140 (also referred to as a "power system"). The secondary power source 140 includes a plurality of generators that are connected in parallel to a common bus. The secondary power 145 may be alternating current, direct current, voltage, or various other forms of power. The secondary power source 140 may provide secondary power to the receiving station 105 through a secondary power connection 142, such as a power line, wiring, or other power delivery component. In some systems, the receiving station 105 may include a transfer switch that may control what source provides power to the receiving station 105. In some systems, the receiving station 105 may be, or may be connected with, a load that the primary power source 130 or the secondary power source 140 may provide power to.

The secondary power source 140 may operate to provide power to the receiving station 105 at various times or when various conditions exist. For example, the secondary power source 140 may provide secondary power 145 to the receiving station 105 when the primary power source 130 is not available to provide the primary power 135 to the receiving station 105, or when the primary power 135 is insufficient to meet the power needs of the receiving station 105. In other situations, the secondary power source 140 may provide secondary power 145 to the receiving station 105 at various other times.

Figure 2:
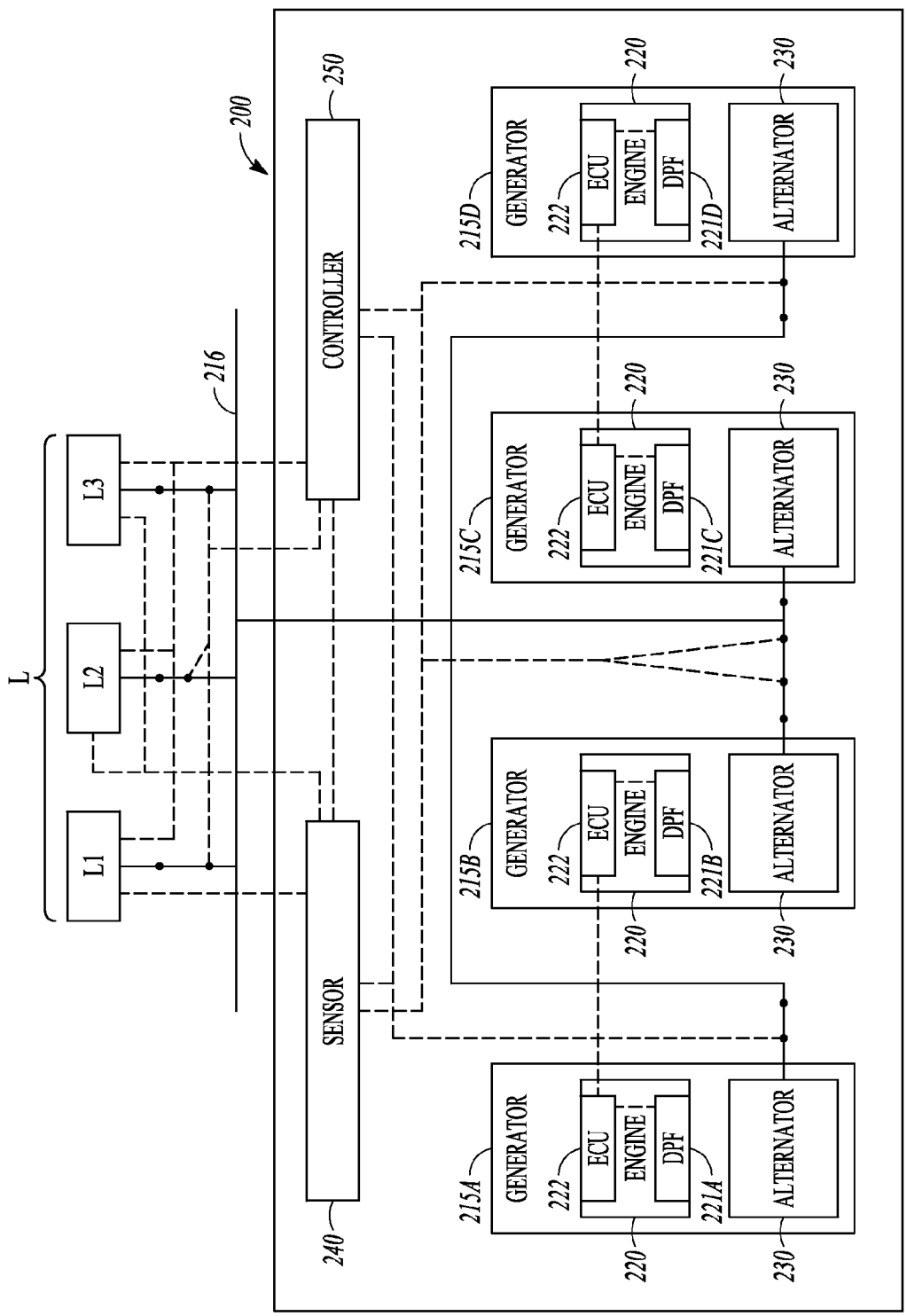
FIG. 2 is an example of a secondary power source for providing power to a receiving station.

FIG. 2 shows an example of a secondary power source 200, which may be similar to or the same as the secondary power source 140. The secondary power source 200 may include a plurality of generators 215A, 215B, 215C, 215D. A controller 250 may be configured to smartly operate the plurality of generators 215A, 215B, 215C, 215D where at least some of the plurality of generators 215A, 215B, 215C, 215D are connected in parallel to a bus 216.

At least some (or all) of the plurality of generators 215A, 215B, 215C, 215D may include an internal combustion engine 220 that is powered by diesel fuel. The other generators 215A, 215B, 215C, 215D may include an external combustion engine, an electric motor, a pneumatic motor, a hydraulic motor, a steam turbine, or various other engines or motors which may produce mechanical energy. In addition, the other generators 215A, 215B, 215C, 215D may be powered by a fuel or resource, such as natural gas, propane, gasoline, or various other fuels.

At least some of the plurality of generators 215A, 215B, 215C, 215D may include an alternator 230. The alternator 230 may be an electromechanical device in communication with the engine 220. The alternator 230 may include or use a rotating magnetic field with a stationary armature, a rotating armature with a stationary magnetic field, or a linear alternator. The alternator 230 may convert the mechanical energy created by the engine 220 to electrical energy, such as alternating current.

The secondary power source 140 may supply the electrical energy from the alternator 230 to the receiving station 105 as the secondary power 145. In other systems, the secondary power source 200 may include various other components and may generate electrical energy or secondary power 145 in various other ways.

The controller 250 of the secondary power source 200 may communicate with at least some (or all) of the plurality of generators 215A, 215B, 215C, 215D. The controller 250 may additionally communicate with the primary power source 130 or a transfer switch of the receiving station 105. The controller 250 may include hardware, software, firmware, or a combination. The controller 250 may include or access logic or instructions stored in a computer readable medium. The controller 250 may include a processor or processing component that may execute the logic or instructions stored in the computer readable medium.

The controller 250 may control an operation of the secondary power source 200, such as when at least some of the plurality of generators 215A, 215B, 215C, 215D are operated or stopped, for how long the at least some of the plurality of generators 215A, 215B, 215C, 215D are operated, the speed or specifications that at least some of the plurality of generators 215A, 215B, 215C, 215D are operated at, and various other operational specifications. As an example, the controller 250 may determine that the primary power 135 is interrupted or insufficient, and may instruct at least some of the plurality of generators 215A, 215B, 215C, 215D to run in response to the determination. Other examples are possible.

The controller 250 may communicate with, and use information from, the sensor 240 in determining the specifications for operating at least some (or all) of the plurality of generators 215A, 215B, 215C, 215D. As an example, the controller 250 may receive information from the sensor 240 about one or more parameters of the secondary power source 200, which the controller 250 may use to determine which of the plurality of generators 215A, 215B, 215C, 215D to operate in order to meet an overall Load L that is electrically connected to the bus 216. In addition, the determination as which of the plurality of generators 215A, 215B, 215C, 215D to operate may be based on when a DPF 221A, 221B, 221C, 221D in any of the diesel engines 220 that are part of generators 215A, 215B, 215C, 215D requires regeneration.

The sensor 240 may communicate parameter information (including whether or not any of the DPFs require regeneration) to the controller 250 in various ways, such as through a bus, wired communication line, wirelessly, or in various other ways. In some systems, the sensor 240 may be directly coupled to an input of the controller 250. In other systems, the sensor 240 may communicate parameters to the controller 250 indirectly, such as by or through a separate control module, such as an engine control unit 222. In some of these systems, the separate control module may then communicate the measured parameter information to the controller 250. The controller 250 may then use the parameter information to determine which of the plurality of generators 215A, 215B, 215C, 215D to operate in order to meet an overall load L and/or which of the DPFs 221A, 221B, 221C, 221D to regenerate.

The controller 250 may receive the parameter information from the sensor 240 continuously, periodically, at intervals, upon request, when triggered by an event, randomly, or at various other times. The controller 250 may control the sensor 240 to control power to the sensor 240 or request a measurement or data about a measurement of the parameter. For example, the controller 250 may request and receive parameter information from the sensor 240 about soot levels in each of the DPFs and/or the exhaust gas temperature for each of the engines 220. Other examples are possible.

Various types of sensors 240 are possible and may be used to measure one or more parameters. As an example, the sensor 240 may be a temperature sensor and may measure a temperature of a component, input, or output of the secondary power source 200. For example, the sensor 240 may be an oil temperature sensor or an oil pan sensor configured to measure a temperature of an oil of the engine 220. The oil temperature sensor may be a surface mount thermocouple sensor. The surface mount thermocouple may be positioned adjacent to or on a surface of an oil pan or oil containment compartment of the secondary power source 200. Other examples of temperature sensors may include a coolant temperature sensor, an exhaust temperature sensor, an engine temperature sensor, an enclosure temperature sensor, an external temperature sensor, or various other temperature sensors.

The sensor 240 may alternatively be a different type of sensor and may measure a parameter other than temperature. For example, the sensor 240 may be an oil pressure sensor and may be configured to measure the oil pressure of the power generation component 215. As another example, the sensor 240 may be a chemical or compositions sensor. The sensor 240 may be a sensor configured to measure a moisture content of the oil of the engine 220. The sensor 240 may be a viscosity sensor configured to measure a viscosity of engine oil. In some variations, the sensor 240 may be an ignition switch or an engine kill switch. The sensor 240 may be a mechanical or electrical sensor.

In some secondary power sources 200, multiple sensors 240 of different types or measuring different parameters may be used. Various other sensors are possible.

The sensor 240 may alternatively provide measured parameters to an engine control unit 222 (ECU), which, in turn, may send signals corresponding to the measured parameters to the controller 250. The ECU 222 may operate the engine 220 according to predetermined specifications. These predetermined specifications may be different for each engine 220 or may be modified by a user or circumstances under which the secondary power sources 200 is operating (e.g., changing load L)

The first generator 215A may be configured to be electrically connected to at least one other generator 215B, 215C, 215D. Each generator 215A, 215B, 215C, 215D may be configured to be connected to a bus 216. The bus 216 is electrically connected to at least one load L1, L2, L3. Multiple loads L1, L2, L3 may be simultaneously electrically connected to the bus 216 for a total load L on the bus 216.

The controller 250 may operate the first generator 215A and determine a need to regenerate a diesel particulate filter 221A in the first generator 215A. The controller 250 may communicate the need to regenerate the diesel particulate filter 221A to at least one other generator 215B, 215C, 215D. As an example, the controller 250 may communicate the need to regenerate the diesel particulate filter 221A to the ECU 222 of at least one other generator 215B, 215C, 215D.

The controller 250 may operate each generator 215A, 215B, 215C, 215D in the plurality of generators 215A, 215B, 215C, 215D and send a signal to decrease (or increase) the load L on the secondary power source 200. The controller 250 may include load control parameters or send the signals to a separate load control module (not shown) that connects and disconnects the various loads L1, L2, L3 from the bus 216.

Figure 3:
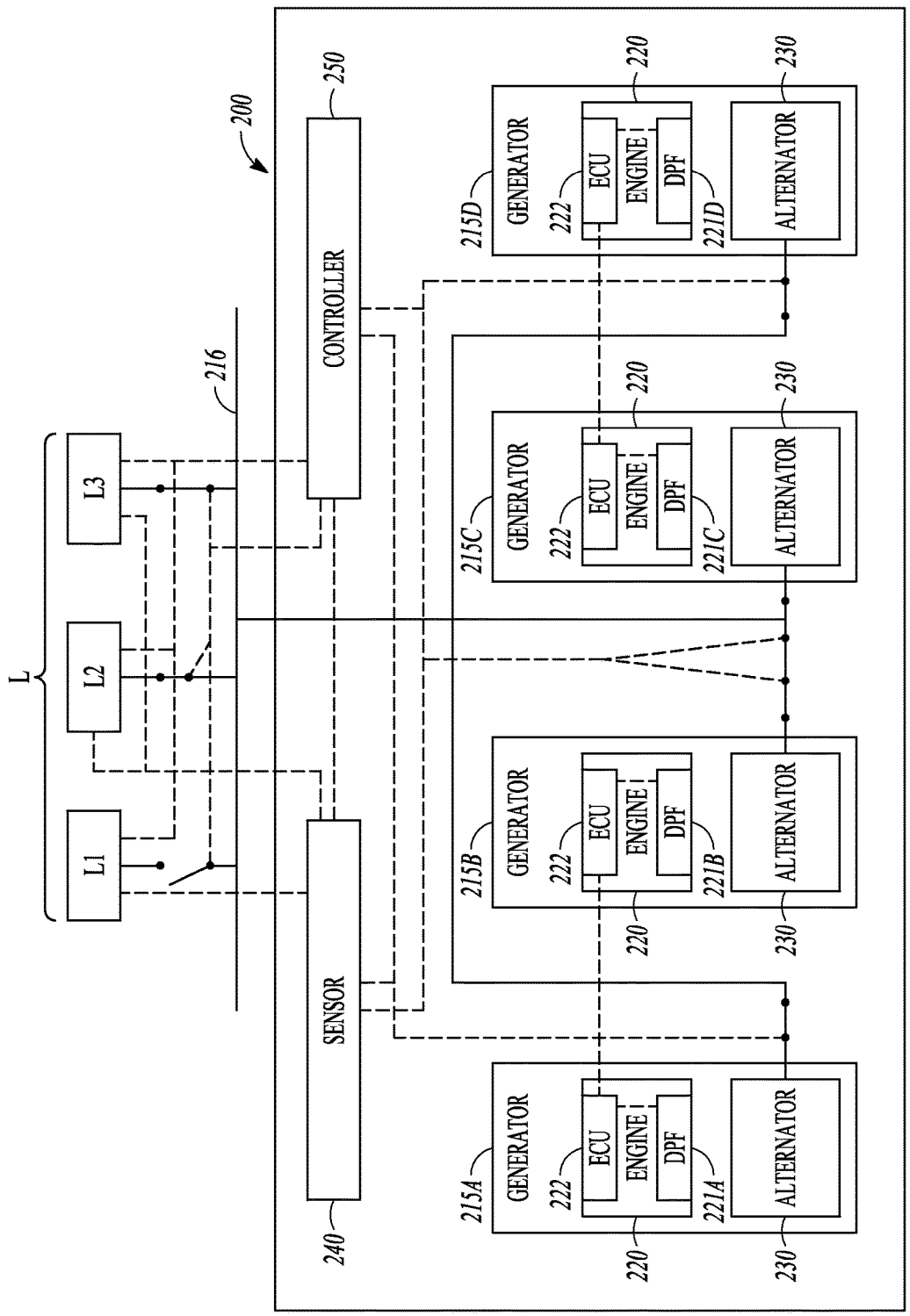
FIG. 3 shows the example secondary power source of FIG. 3 with a load disconnected.

A comparison of FIGS. 2 and 3 shows where the controller 250 has disconnected load L1 from bus 216. The controller 250 or separate load control module may determine which of the loads L1, L2, L3 need to shed or added. For example, one or more loads L1, L2, L3 may need to be shed when the load L cannot be met by the secondary power source 200. Other reasons for adding and shedding loads relative to regenerating any of DPFs 221A, 221B, 221C, 221D will be described below.

The controller 250 may initiate regeneration of the diesel particulate filter 221A in the first generator 215A. The controller 250 may initiate regeneration by sending a signal to the ECU 222 of the engine 220 or the controller 250 may initiate regeneration by directly controlling the engine 220.

The DPF regeneration may be any type of DPF regeneration that is described above. In addition, the DPF regeneration may be any type of DPF regeneration that is known now or discovered in the future. The controller 250 may also select from different types of DPF regeneration based on a variety of factors.

The controller 250 may initiate regeneration based on measured parameters received from the sensor 240 and/or the ECU 222. The sensor 240 and/or the ECU 222 may monitor soot levels in the DPFs 221A, 221B, 221C, 221D. Alternatively, the sensor 240 and/or the ECU 222 may monitor changing exhaust pressure in the engines 220 in order to determine if DPF regeneration is required. Other methods of determining whether DPF regeneration is required may also be used.

The controller 250 may maintain a base load on the first generator 215A during regeneration of the diesel particulate filter 221A. The base load may be maintained on the first generator 215A because the temperature of the exhaust gases from the engine 220 may be well suited to perform regeneration of the DPF 221A. If the exhaust gases are at an appropriate temperature, the particulates in the DPF 221A will combust and be expelled from the engine 220.

The controller may have to adjust the load on one or more the other generators 215B, 215C, 215D in order to maintain the base load on the first generator 215A during regeneration of the diesel particulate filter 221A. Alternatively, the controller 250 may have to disconnect (or connect) one or more the other generators 215B, 215C, 215D in order to maintain an appropriate base load on the first generator 215A during regeneration of the diesel particulate filter 221A.

Figure 4:
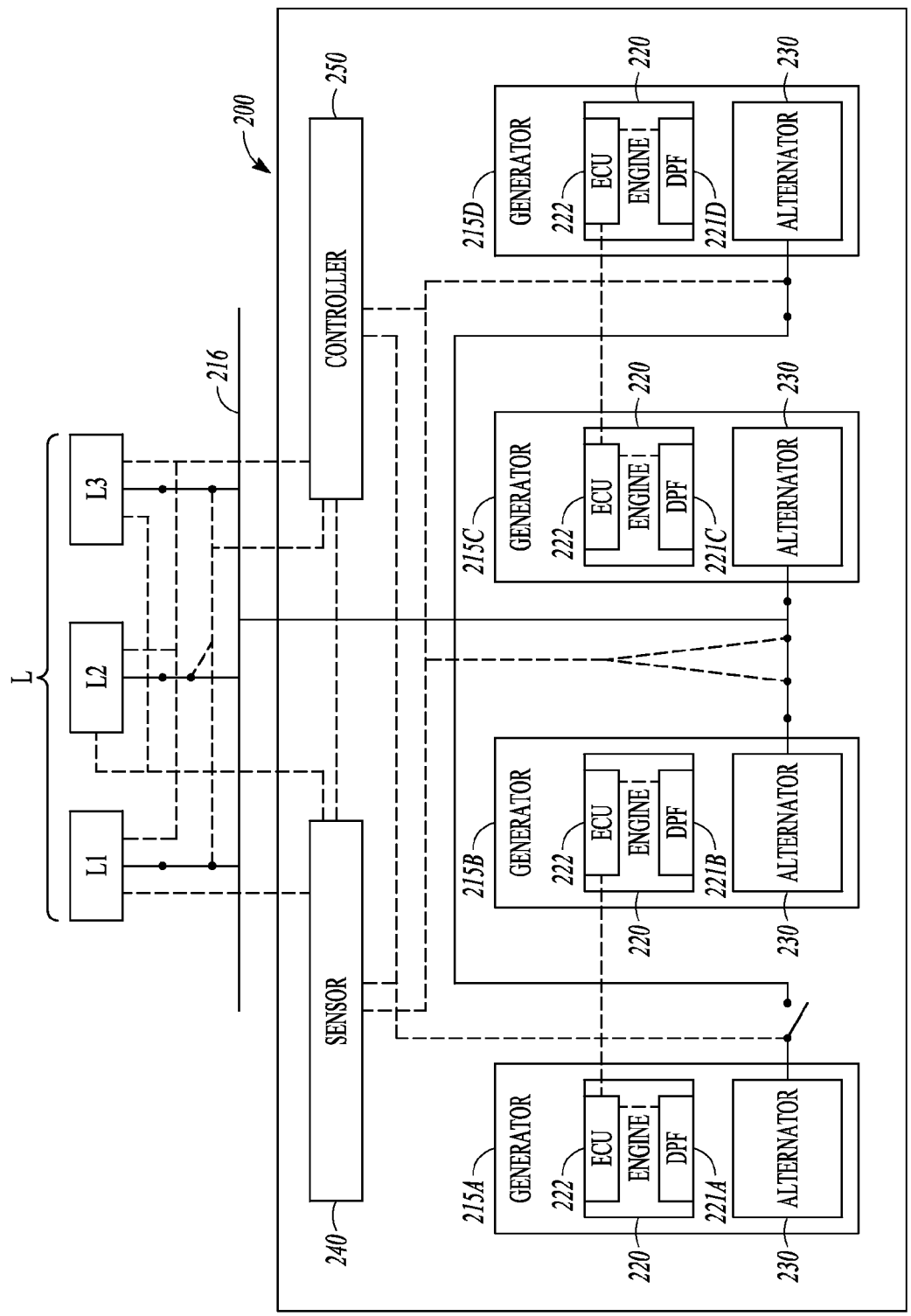
FIG. 4 shows the example secondary power source of FIG. 3 with a generator disconnected.

A comparison of FIGS. 2 and 4 shows the generator 215A being disconnected from the bus 216. Other generators or combinations of generators may also be disconnected (or connected) in order to maintain an appropriate base load on the first generator 215A during regeneration of the diesel particulate filter 221A.

The sensor 240 (or another sensor) may monitor the load L and/or individual loads L1, L2, L3 as part of maintaining an appropriate base load on the first generator 215A during regeneration of the diesel particulate filter 221A. Alternatively, the controller 250, the ECU 222 and/or a separate load control module may monitor the load L and/or individual loads L1, L2, L3.

Figure 5:
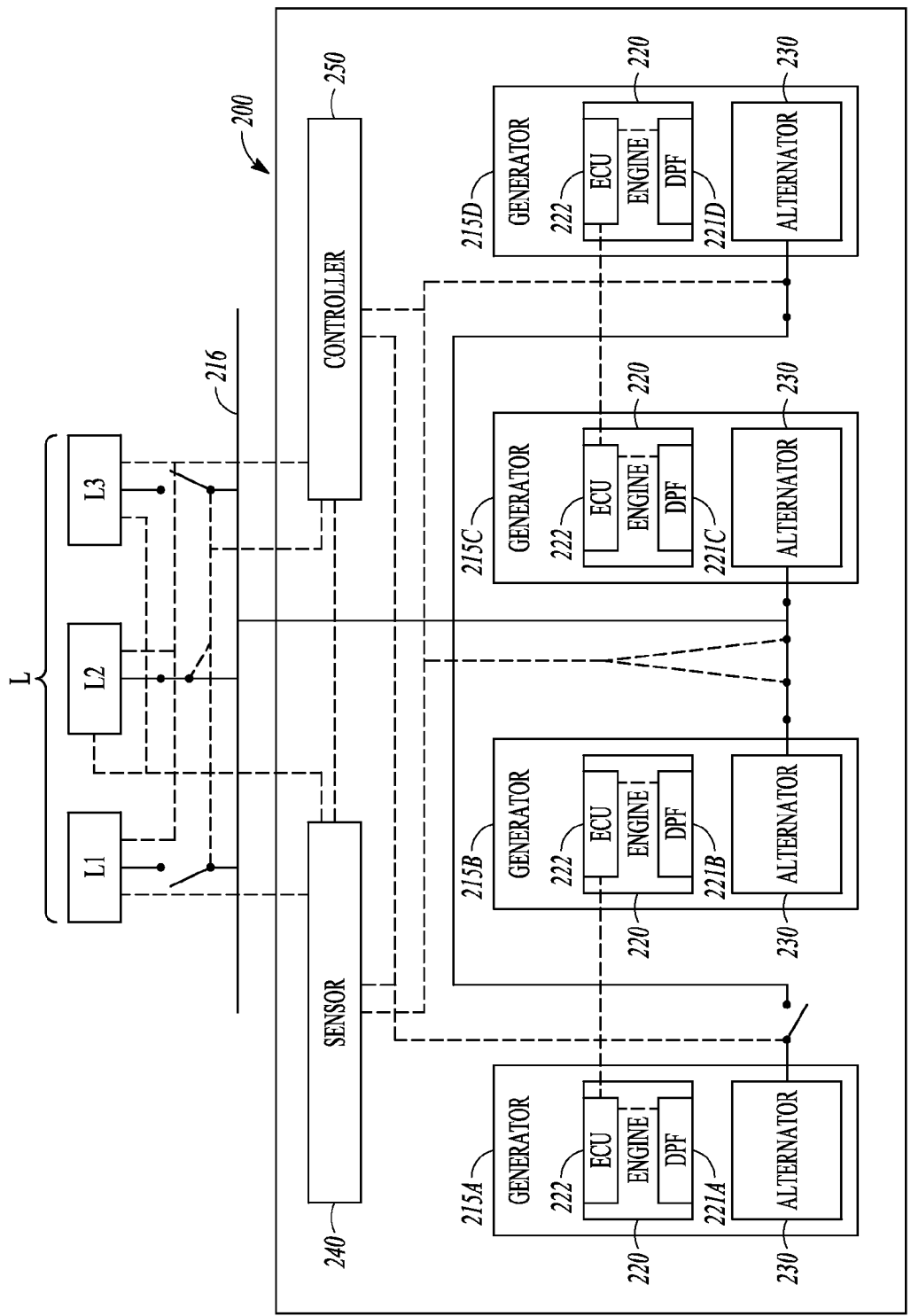
FIG. 5 shows the example secondary power source of FIG. 4 with two loads disconnected.

A comparison of FIGS. 2 and 5 shows that the controller 250 may disconnect the first generator 215A from the bus 216 in order to initiate regeneration of the diesel particulate filter 221A in the first generator 215A. The controller 250 may disconnect the first generator 215A from the bus 216 because power may not be required of the first generator 215A and the DPF 221A may need to be regenerated. In addition, if the engine 220 has recently been operating, the warmed up engine may be well suited for performing regeneration of the DPF 221A.

The controller 250 may have to adjust the load on one or more the other generators 215B, 215C, 215D in order to disconnect the first generator 215A from the bus 216 for the purpose of regenerating the diesel particulate filter 221A. Alternatively, the controller 250 may have to connect one or more the other generators 215B, 215C, 215D in order to meet the load demand once the first generator 215A is taken offline.

The sensor 240 (or another sensor) may monitor the load L and/or individual loads L1, L2, L3 when the first generator 215A is disconnected from the bus 216 during regeneration of the diesel particulate filter 221A. Alternatively, the controller 250, the ECU 222 and/or a separate load control module may monitor the load L and/or individual loads L1, L2, L3.

The controller 250 may send a signal to decrease the load L on the secondary power source 200 to compensate for disconnecting the first generator 215A from the bus 216. The controller 250 may send the signal to a load control module to selectively disconnect the loads L1, L2, L3 from the bus 216 (loads L1 and L3 are disconnected in FIG. 5).

Alternatively, the controller 250 and/or the load control module may send the signal directly to devices (e.g., circuit breakers or contactors) that are able to selectively disconnect the loads L1, L2, L3 from the bus 216. Other forms are contemplated where the controller 250 and/or the load control module may send signals to add a load to the bus 216.

The controller may cancel the regeneration of the diesel particulate filter 221A in the first generator 215A and connect the first generator 215A to the bus 216 when the controller 250 determines that the first generator 215A is needed to meet the load L connected to the bus 216. Alternatively, the load control module may send a signal to the controller 250 that the first generator 215A may be required in order to meet the load L connected to the bus 216.

Figure 6:
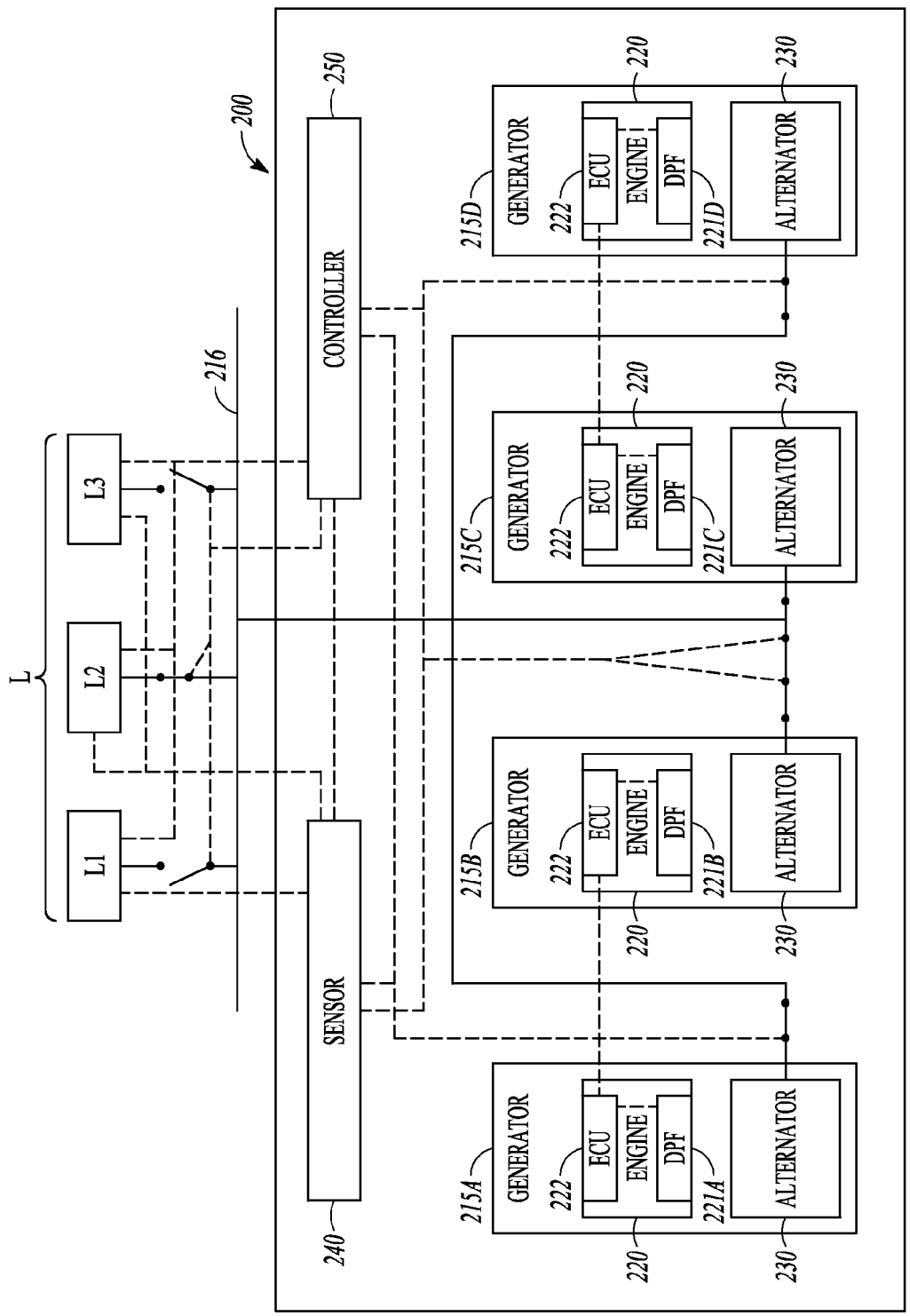
FIG. 6 shows the example secondary power source of FIG. 5 with a generator reconnected.

In addition, the sensor 240 (or another sensor) may monitor the load L and/or individual loads L1, L2, L3 when the first generator 215A is disconnected from the bus 216 during regeneration of the diesel particulate filter 221A. A comparison of FIGS. 5 and 6 shows the first generator 215A being reconnected to the bus 216. Other generators or combinations of generators may also be connected (or disconnected) in order to meet the load L demand on the secondary power source 200.

The controller 250 may send a signal to prevent sudden changes in the load L that would cancel the regeneration of the diesel particulate filter 221A in the first generator 215A. Alternatively, a load control module may prevent sudden changes in the load L or send a signal to the controller 250 to prevent sudden changes in the load L that would cancel the regeneration of the diesel particulate filter 221A.

The controller 250 or load control module may have to connect or disconnect some of the loads L1, L2, L3 in order to prevent sudden changes in the overall load L. The sensor 240 (or another sensor) may monitor the load L and/or individual loads L1, L2, L3 during regeneration of the diesel particulate filter 221A to ensure there no sudden changes in the individual loads L1, L2, L3 and/or the overall load L that is connected to the bus 216. Alternatively, the controller 250, the ECU 222 and/or a separate load control module may monitor the load L and/or individual loads L1, L2, L3.

Figure 7:
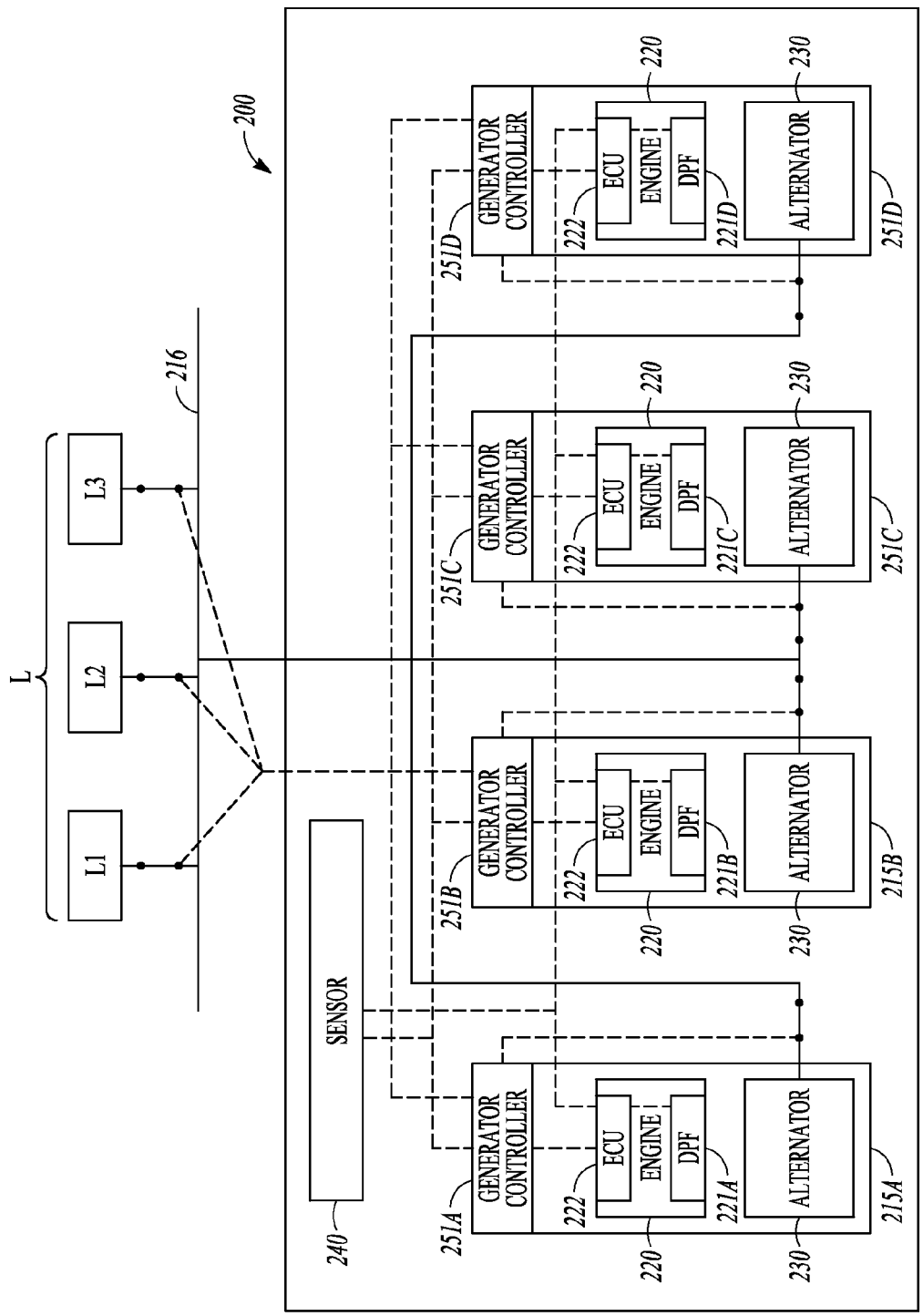
FIG. 7 is an example of a secondary power source for providing power to a receiving station.

FIG. 7 shows an example secondary power source 200 where each generator 215A, 215B, 215C, 215D includes a corresponding generator controller 251A, 251B, 251C, 251D. Each generator controller 251A, 251B, 251C, 251D is configured to initiate regeneration of the diesel particulate filter 221A, 221B, 221C, 221D in the generator 215A, 215B, 215C, 215D that is operated by the respective generator controller 251A, 251B, 251C, 251D.

In addition, each generator controller 251A, 251B, 251C, 251D may be configured to operate with a separate load control module that may determine which of the loads L1, L2, L3 need to shed or added. For example, one or more loads L1, L2, L3 may need to be shed when the load L cannot be met by the secondary power source 200.

Each generator controller 251A, 251B, 251C, 251D may initiate regeneration of the diesel particulate filter 221A, 221B, 221C, 221D in the generator 215A, 215B, 215C, 215D that is operated by the respective generator controller 251A, 251B, 251C, 251D. Alternatively, one of the generator controllers 251A, 251B, 251C, 251D may initiate regeneration of any of the diesel particulate filters 221A, 221B, 221C, 221D.

Each generator controller 251A, 251B, 251C, 251D may initiate regeneration by sending a signal to the ECU 222 of the respective engine 220 for each generator controller 251A, 251B, 251C, 251D or each generator controller 251A, 251B, 251C, 251D may initiate regeneration by directly controlling any of the engines 220.

Each generator controller 251A, 251B, 251C, 251D may initiate regeneration based on measured parameters received from the sensor 240 and/or the ECU 222. The sensor 240 and/or the ECU 222 may monitor soot levels in the DPFs 221A, 221B, 221C, 221D. Alternatively, the sensor 240 and/or the ECU 222 may monitor changing exhaust pressure in the engines 220 in order to determine if DPF regeneration is required. Other methods of determining whether DPF regeneration is required may also be used.

Figure 8:
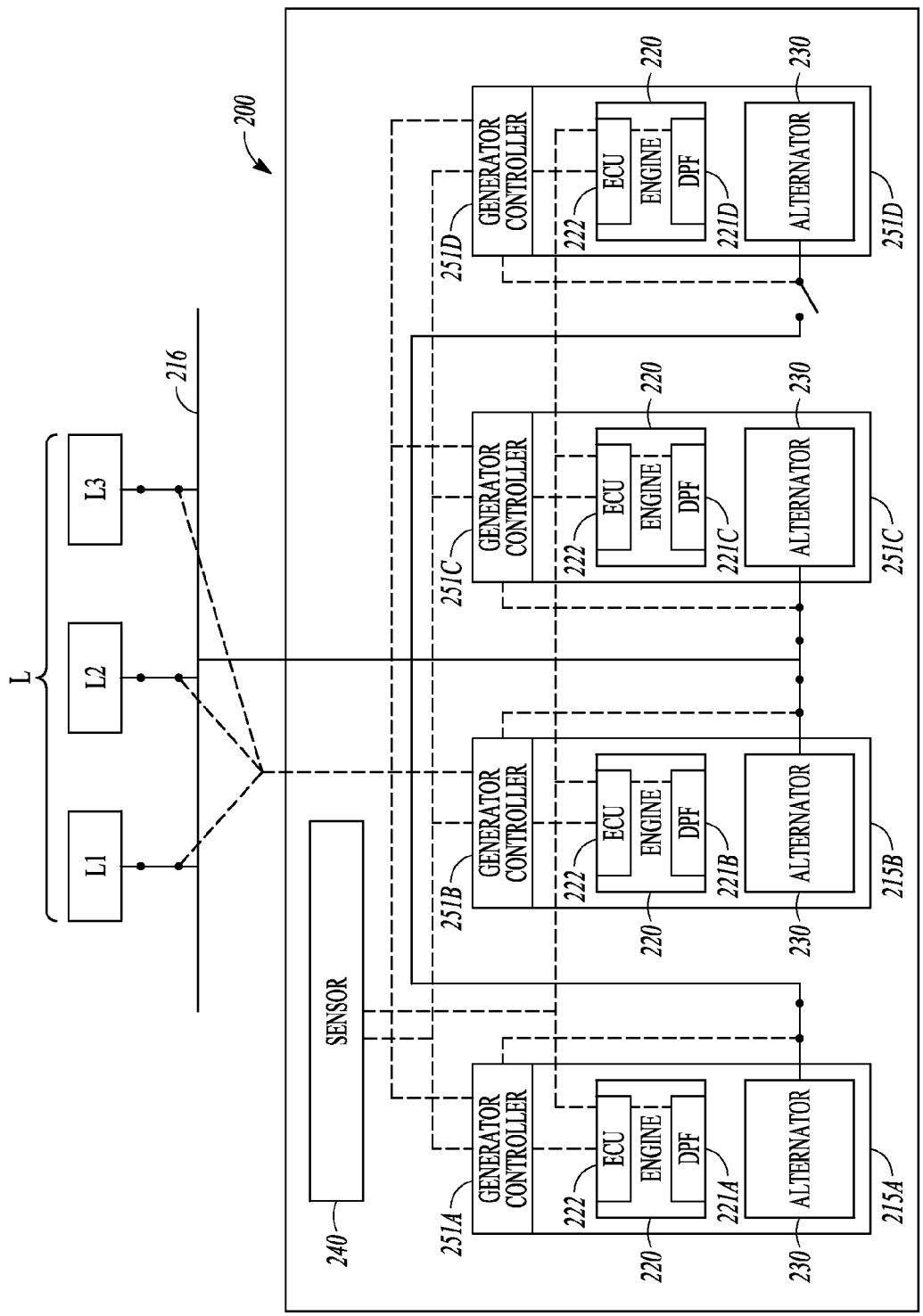
FIG. 8 shows the example secondary power source of FIG. 7 with a generator disconnected.

A comparison of FIGS. 7 and 8 shows that each generator controller 251A, 251B, 251C, 251 may disconnect the generator 215A, 215B, 215C, 215D that is operated by the respective generator controller 251A, 251B, 251C, 251D (alternator 230 of generator 215D has been disconnected in FIG. 8). Alternatively, any one of the generator controllers 251A, 251B, 251C, 251D may disconnect any of the generators 215A, 215B, 215C, 215D from the bus 216 in order to initiate regeneration of any of the diesel particulate filter 221A, 221B, 221C, 221D.

Each generator controller 251A, 251B, 251C, 251D may disconnect the generators 215A, 215B, 215C, 215D from the bus 216 because power may not be required of all of the generators 215A, 215B, 215C, 215D and one or more of the DPFs 221A, 221B, 221C, 221D may need to be regenerated.

Each generator controller 251A, 251B, 251C, 251D may have the ability to adjust the load on one or more of the generators 215A, 215B, 215C, 215D in order to disconnect any of the generators 215A, 215B, 215C, 215D from the bus 216 for the purpose of regenerating one or more of the DPFs 221A, 221B, 221C, 221D. Alternatively, each generator controller 251A, 251B, 251C, 251D may have to reconnect one or of the generators 215A, 215B, 215C, 215D in order to meet the load demand once any of the generators 215A, 215B, 215C, 215D is taken offline.

The sensor 240 (or another sensor) may monitor the load L and/or individual loads L1, L2, L3 when any of the generators 215A, 215B, 215C, 215D is disconnected from the bus 216 during regeneration of the respective diesel particulate filters 221A, 221B, 221C, 221D. Alternatively, each generator controller 251A, 251B, 251C, 251D, and/or ECU 222 and/or a separate load control module may monitor the load L and/or individual loads L1, L2, L3.

Figure 9:
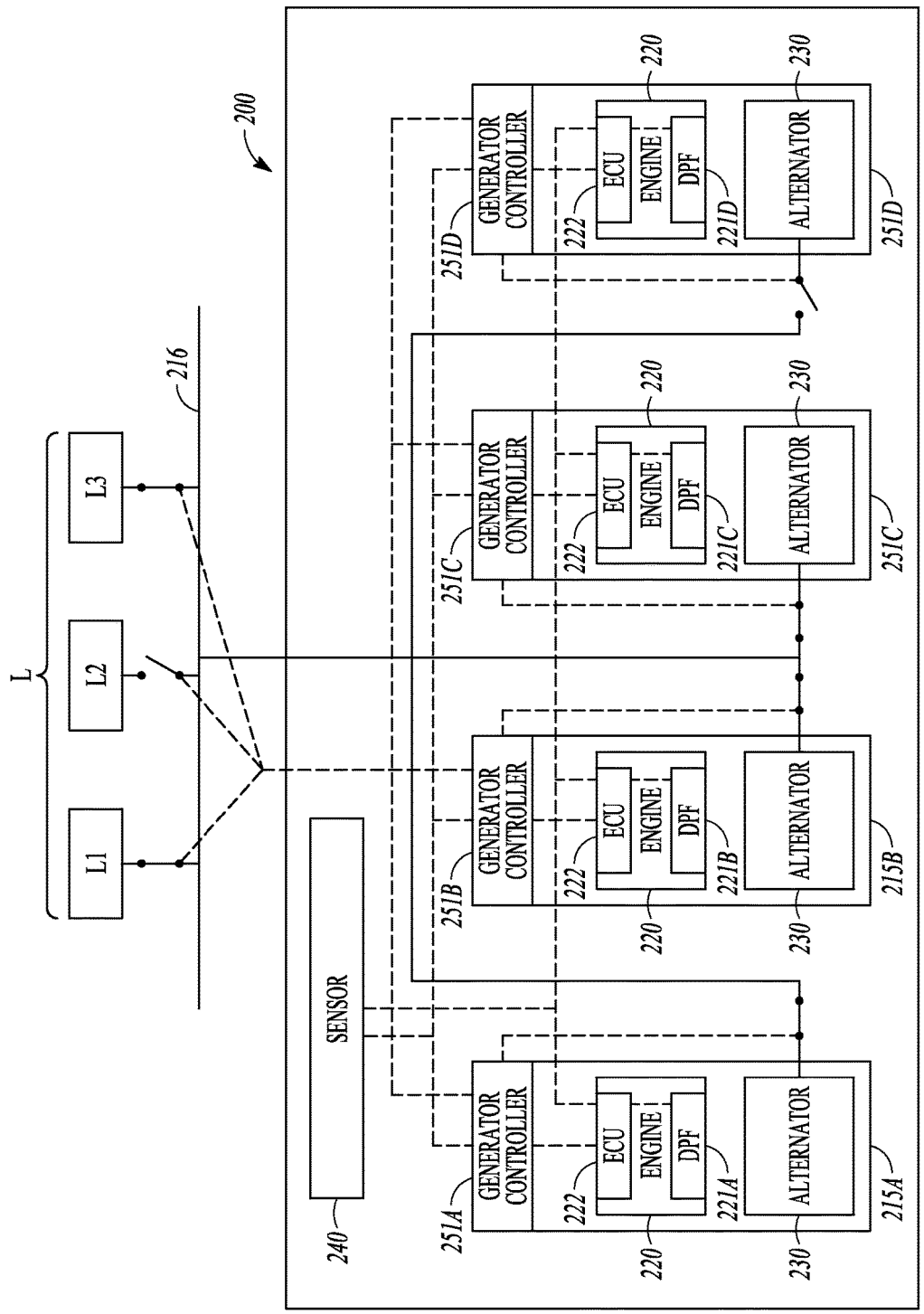
FIG. 9 shows the example secondary power source of FIG. 8 with a load disconnected.

Each generator controller 251A, 251B, 251C, 251D may be configured to send a signal to decrease the load L on the secondary power source 200 to compensate for disconnecting any of the generators 215A, 215B, 215C, 215D from the bus 216. A comparison of FIGS. 8 and 9 shows that each generator controller 251A, 251B, 251C, 251 may disconnect one of the loads L1, L2, L3 from the bus 216 (load L2 has been disconnected in FIG. 9). Alternatively, each generator controller 251A, 251B, 251C, 251D may send the signal to a load control module to selectively disconnect the loads L1, L2, L3 from the bus 216.

In some forms, each generator controller 251A, 251B, 251C, 251D and/or the load control module may send the signal directly to devices (e.g., circuit breakers or contactors) that are able to selectively disconnect the loads L1, L2, L3 from the bus 216. Other forms are contemplated where each generator controller 251A, 251B, 251C, 251D and/or the load control module may send signals to add a load to the bus 216.

Any of the generators 215A, 215B, 215C, 215D in the secondary power source 200 may include an alternator 230 that produces electricity from the mechanical energy generated by respective engine 220. Each alternator 230 may be configured to be electrically connected in parallel with each of the other alternators 230 to the bus 216 with the bus 216 being electrically connected to at least one load L1, L2, L3. In any of the forms of the secondary power source 200 described herein, disconnecting any of the generators 215A, 215B, 215C, 215D from the bus 216 may include disconnecting at least one of the respective alternators 230 in the generators 215A, 215B, 215C, 215D from the bus 216.

The controller 250 may determine when any of the diesel particulate filters 221A, 221B, 221C, 221D require regeneration. The controller 250 may then disconnect the respective alternator 230 of at least one of the generators 215A, 215B, 215C, 215D that includes the diesel particulate filters 221A, 221B, 221C, 221D which require regeneration from the bus 216 (see, e.g., FIGS. 4 and 5).

Alternatively, each generator controller 251A, 251B, 251C, 251D may determine when any of the diesel particulate filters 221A, 221B, 221C, 221D require regeneration. At least one of the generator controllers 251A, 251B, 251C, 251D may then disconnect the respective alternator 230 of at least one of the generators 215A, 215B, 215C, 215D that includes the diesel particulate filter 221A, 221B, 221C, 221D which requires regeneration from the bus 216 (see, e.g., FIGS. 8 and 9).

The controller 250 may send a signal to decrease the load L on the secondary power source 200 before disconnecting the respective alternator 230 of the generator 215A, 215B, 215C, 215D that includes the diesel particulate filter 221A, 221B, 221C, 221D which requires regeneration from the bus 216. Alternatively, at least one (or each) generator controller 251A, 251B, 251C, 251D may send a signal to decrease the load L on the secondary power source 200 before disconnecting the respective alternator 230 of the generator 215A, 215B, 215C, 215D that includes the diesel particulate filter 221A, 221B, 221C, 221D which requires regeneration from the bus 216.

Figure 10:
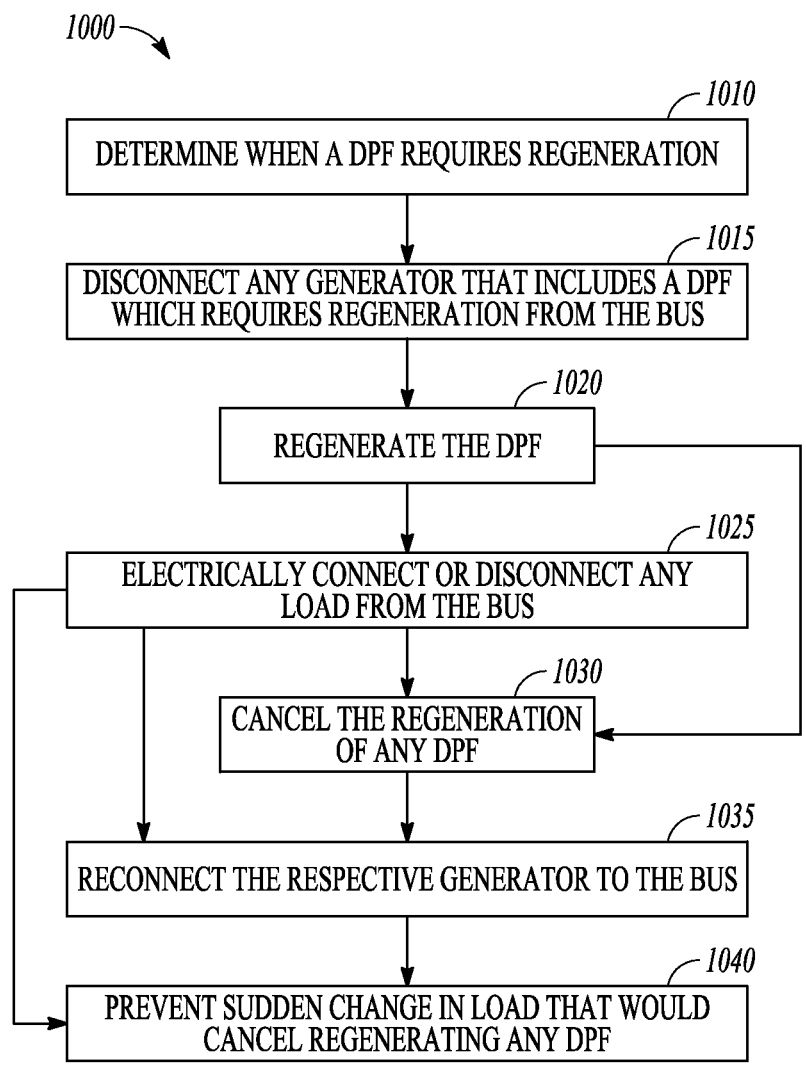
FIG. 10 is an example method for controlling operation of a secondary power source.

FIG. 10 shows an example of one method [100] to control an operation of the secondary power source 200. The method [100] may be performed by the controller 250 or various other components of the secondary power source 200. Other forms are contemplated where the operations, functions or description of the controller 250 relative to any of the methods described herein may alternatively be performed individually or collectively by the generator controllers 251A, 251B, 251C, 251D shown and described in FIGS. 7-9. The method [100] may be implemented as logic, which the controller 250 may execute.

The controller 250 or another component of the secondary power source 200 may operate a plurality of generators 215A, 215B, 215C, 215D that are electrically connected in parallel to a bus 216. Any of the plurality of generators 215A, 215B, 215C, 215D may supply power to at least one load L1, L2, L3 via the bus 216.

The controller 250 may determine when a diesel particulate filter 221A, 221B, 221C, 221D in any of the plurality of generators 215A, 215B, 215C, 215D requires regeneration [110]. The controller 250 may use a sensor 240 or one or more ECUs 22 in the engines 220 of the generators 215A, 215B, 215C, 215D to determine whether any of the diesel particulate filters 221A, 221B, 221C, 221D require regeneration.

The controller 250 may disconnect any of the respective generators 215A, 215B, 215C, 215D that includes a diesel particulate filter 221A, 221B, 221C, 221D which requires regeneration from the bus 216 [115]. For example, the controller 250 may electrically disconnect the alternator 230 of the engine 220 that includes the diesel particulate filter 221A, 221B, 221C, 221D which requires regeneration.

The controller 250 may regenerate the diesel particulate filter 221A, 221B, 221C, 221D which requires regeneration [120]. For example, the controller 250 and/or any of the ECUs 222 may monitor temperature information received from a sensor 240 relating to whether the exhaust gas temperature from the engine 220 is suitable for performing regeneration. Additionally or alternatively, the controller 250 may monitor any other parameter information gathered or received from various other sensors 240.

Various other examples are possible. The parameters may be set automatically or by a user.

The controller 250 may monitor parameters continuously, periodically, at intervals, randomly, when triggered, or at various other times. For example, the controller 250 may continuously monitor the level of particulates in each diesel particulate filter 221A, 221B, 221C, 221D.

The controller 250 may change the load L on the bus 216 by electrically connecting or disconnecting any of the loads L1, L2, L3 from the bus 216 [125]. Alternatively, the controller 250, the ECU 222 and/or a separate load control module may monitor and disconnect/connect the individual loads L1, L2, L3 from the bus 216.

The controller 250 may send a signal to decrease the load L on the secondary power source 200 to compensate for disconnecting any of the generators 215A, 215B, 215C, 215D that are electrically connected in parallel to the bus 216. The controller 250 and/or the load control module may send the signal directly to devices (e.g., circuit breakers or contactors) that are able to selectively disconnect the loads L1, L2, L3 from the bus 216.

Other forms are contemplated where the controller 250 and/or the load control module may send signals to add a load to the bus 216. For example, the controller 250 may maintain a base load on any of the generators 215A, 215B, 215C, 215D during regeneration of the respective diesel particulate filters 221A, 221B, 221C, 221D. The base load may be maintained on the appropriate generator 215A, 215B, 215C, 215D because the temperature of the exhaust gases from the corresponding engine 220 may be well suited to perform regeneration of the particular DPF 221A, 221B, 221C, 221D.

The controller 250 may cancel the regeneration of any of the diesel particulate filters 221A, 221B, 221C, 221D [130] and reconnect the respective generator 215A, 215B, 215C, 215D to the bus 216 when the particular generator 215A, 215B, 215C, 215D is needed to meet the load L on the bus [135]. Alternatively, the load control module may send a signal to the controller 250 that one or more of the generators 215A, 215B, 215C, 215D may be required in order to meet the load L connected to the bus 216.

The sensor 240 (or another sensor) may monitor the load L and/or individual loads L1, L2, L3 when one or more of the generators 215A, 215B, 215C, 215D are disconnected from the bus 216 during regeneration of the diesel particulate filter 221A. A comparison of FIGS. 5 and 6 shows the first generator 215A being reconnected to the bus 216. Other generators or combinations of generators may also be connected in order to meet the load L demand on the secondary power source 200.

The controller 250 may prevent sudden changes in the load L that would cancel regenerating the any of the diesel particulate filters 221A, 221B, 221C, 221D [140]. Alternatively, a load control module may prevent sudden changes in the load L or send a signal to the controller 250 to prevent sudden changes in the load L that would cancel the regeneration of any of the diesel particulate filters 221A.

The sensor 240 (or another sensor) may monitor the load L and/or individual loads L1, L2, L3 during regeneration of any of the diesel particulate filters 221A, 221B, 221C, 221D to ensure there no sudden changes in the individual loads L1, L2, L3 and/or the overall load L that is connected to the bus 216. Alternatively, the controller 250, the ECU 222 and/or a separate load control module may monitor the load L and/or individual loads L1, L2, L3.

The method of FIG. 10 may include fewer or more blocks. For example, in some variations, the controller 250 may perform one or more blocks of FIG. 10 in a different order or simultaneously. Other variations are possible.

The controller 250 and/or ECUs 222 may monitor a duration of any regeneration procedure. For example, the controller 250 may start a clock, timer, or counter when the DPF regeneration is started, and may monitor the clock, timer, or counter as the DPF regeneration operates.

The controller 250 may determine the appropriate duration using a look-up table. The controller 250 may compare parameter information received from the sensor 240 or ECUs 222 with the entries in the look-up table. The controller 250 may search for the entry of the look-up table that corresponds to the measured parameter, and may identify the duration and/or temperature to operate the engine 220 in order to perform DPF regeneration. Other examples are possible.

The controller 250 may additionally or alternatively perform one or more algorithms using the measured parameter information as an input to determine the duration to perform DPF regeneration. The controller 250 may insert the parameter information received from the sensor 240 into an algorithm, which may output the duration of the exercise mode. Based on the results or outputs of the algorithm, the controller 250 may instruct the secondary power source 200 to perform DPF regeneration, including the duration of the regeneration.

The controller 250 may determine the duration to perform DPF regeneration based on engine exhaust gas temperature. The controller 250 may receive signals from sensor 240 and/or ECU 222. The controller 250 may determine the DPF regeneration duration by using a look-up table, algorithm, or in various other ways.

The controller 250 may identify when the DPF regeneration is complete. The controller 250, sensor 240, ECU 222 or another component of the secondary power source 200 may monitor the amount of particulates in the DPF or exhaust gas pressure. Other variations are possible. If the DPF regeneration has been completed, then the controller 250 or any of the ECUs 222 may return the secondary power source 200 to a normal operating mode.

The controller 250, sensor 240 and/or any ECU 222 may receive updated parameter information as the DPF is being regenerated, and may set or update the duration of the DPF regeneration based on the updated parameter information. For example, the controller 250 may receive updated parameter information as the DPF is being regenerated, and may refer back to the look-up table 700, the algorithm, or another look-up table or algorithm, to update the temperature and/or duration of the DPF regeneration based on the updated parameter information. The controller 250 may instruct any of the ECUs 222 modify the DPF regeneration based on the additional determinations and calculations. Updating the DPF regeneration may be useful in situations where the measured parameter changes in a way that may not be expected based on normal conditions.

The thresholds, parameters, tables, and algorithms used in performing DPF regeneration may be set and controlled automatically. Additionally or alternatively, the controller 250 may include an interface through which a user may interact with the secondary power source 200. The controller 250 may be configured to receive inputs from a user through the interface to allow a user to set or modify one or more thresholds, tables, or algorithms. The controller 250 may be configured to receive inputs from a user through the interface to allow the user to determine which parameters may be used to perform DPF regeneration. Other variations are possible.

When the controller 250 determines the specifications for operating the secondary power source 200, such as when or in what manner to run one or more components of the secondary power source 200 or to perform regeneration on any of the diesel particulate filters 221A, 221B, 221C, 221D, the controller 250 may send a signal or instructions to the other components to perform the DPF regeneration. In other examples, the controller 250 may not directly instruct a component to operate according to certain specifications, but may instead instruct an intermediary component, such as engine control unit 222, to operate the desired component (such as the engine 220). In still other examples, the controller 250 may actually operate the desired components themselves according to certain specifications. Other variations and examples are possible.

The secondary power source 200 may include, or be connected with, a user interface or display. The display may provide a visual or audible indicator to a user based on the sensed parameters. This may be useful where a user wishes to monitor parameters, or where the user may wish to manually start and stop the secondary power source 200 from performing a DPF regeneration. In other examples, the display may provide information about the sensed parameter, information about the operation of the secondary power source 200, such as its operating history and its present operating conditions, information about any of the loads L1, L2, L3, or various other information. Other examples are possible.

The methods, devices, and logic described above may be implemented in many different ways in many different combinations of hardware, software or both hardware and software. For example, all or parts of the secondary power source 200, such as the controller 250, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

The methods described may include determinations in relation to one or more thresholds. While these methods may refer to a determination about whether a parameter exceeds a threshold, the determination may in other variations be whether the parameter is greater than or equal to, less than, equal to, or less than or equal to a threshold. Other variations are possible.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power system comprising:
a plurality of generators configured to be connected to a bus, wherein each of the plurality of generators includes a diesel particulate filter, wherein the bus is configured to connect to at least one load;
wherein the plurality of generators includes at least one controller that is configured to operate the plurality of generators and determines when there is a need to regenerate one of the diesel particulate filters in one of the plurality of generators;
the at least one controller is further configured to communicate the need to regenerate the diesel particulate filter to each of the other generators in the plurality of generators that include diesel particulate filters which do not require regeneration, and determine a strategy for operating the power system based on the need to regenerate the diesel particulate filter.

2. The power system of claim 1, wherein the at least one controller is configured to send a signal to decrease the load on the power system.

3. The power system of claim 1, wherein the at least one controller is configured to initiate regeneration of the diesel particulate filter.

4. The power system of claim 3, wherein the at least one controller is configured to maintain a base load on the generator that includes the diesel particulate filter that requires regeneration during regeneration of the diesel particulate filter.

5. The power system of claim 1, wherein the at least one controller is configured to disconnect the generator that includes the diesel particulate filter that requires regeneration from the bus and initiates regeneration of the diesel particulate filter.

6. The power system of claim 5, wherein the at least one controller is configured to send a signal to decrease the load on the power system to compensate for disconnecting the generator that includes the diesel particulate filter that requires regeneration from the bus.

7. The power system of claim 5, wherein the at least one controller is configured to cancel the regeneration of the diesel particulate filter in the generator that includes the diesel particulate filter that requires regeneration and connect the generator to the bus when the controller determines that the generator is needed to meet the load connected to the bus.

8. The power system of claim 3, wherein the at least one controller is configured to send a signal to prevent sudden changes in the load that would cancel the regeneration of the diesel particulate filter in the generator that includes the diesel particulate filter that requires regeneration.

9. The power system of claim 1, wherein each of the generators in the plurality of generators includes a generator controller that is configured to operate the respective generators and communicates with each of the other generator controllers in the power system.

10. The power system of claim 9, wherein each of the generator controllers is configured to initiate regeneration of the diesel particulate filter in the generator that is operated by the respective controller.

11. The power system of claim 10, wherein each of the generator controllers is configured to disconnect the respective generator that is operated by the generator controller from the bus and initiate regeneration of the diesel particulate filter in the respective generator.

12. The power system of claim 11, wherein each of the generator controllers is configured to send a signal to decrease the load on the power system to compensate for disconnecting the respective generator from the bus.

13. A power system comprising:
a plurality of generators, wherein each of the generators includes a diesel engine having a diesel particulate filter and each of the generators includes an alternator that produces electricity, wherein each of the alternators is configured to be electrically connected in parallel with each of the other alternators to a bus, wherein the bus is connected to at least one load; and
a controller that is configured to operate the plurality of generators, wherein the controller is configured to determine when any of the diesel particulate filters require regeneration and communicate the need to regenerate the diesel particulate filter to each of the other generators in the plurality of generators that include diesel particulate filters which do not require regeneration, the controller further configured to disconnect the respective alternator of the generator that includes the diesel particulate filter which requires regeneration from the bus.

14. The power system of claim 13, wherein the controller is configured to send a signal to decrease the load on the power system before disconnecting the respective alternator of the generator that includes the diesel particulate filter which requires regeneration from the bus.

15. The power system of claim 13, wherein the controller is configured to initiate regeneration of the diesel particulate filter that requires regeneration.

16. A method comprising:
operating a plurality of generators that are electrically connected in parallel to a bus to supply power to at least one load via the bus;
determining when a diesel particulate filter in any of the plurality of generators requires regeneration;
using a controller to communicate the need to regenerate the diesel particulate filter to each of the other generators in the plurality of generators that include diesel particulate filters which do not require regeneration, and to determine a strategy for operating the plurality of generators based on the need to regenerate the diesel particulate filter;
disconnecting the respective generator that includes the diesel particulate filter which requires regeneration from the bus; and
regenerating the diesel particulate filter which requires regeneration.

17. The method of claim 16, further comprising changing the load on the bus.

18. The method of claim 17, wherein changing the load on the bus includes removing at least one load from the bus to compensate for disconnecting the generator from the bus.

19. The method of claim 16, further comprising canceling the regeneration of the diesel particulate filter and reconnecting the respective generator to the bus when the generator is needed to meet the load on the bus.

20. The method of claim 16, further comprising preventing sudden changes in the load that would cancel regenerating the diesel particulate filter.

* * * * *